United States Patent [19]

Ernst et al.

[11] 4,239,298
[45] * Dec. 16, 1980

[54] ROLLING BEARING FOR LINEAR MOVEMENT HAVING CAGE EXTENDING BEYOND OUTER SLEEVE

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[*] Notice: The portion of the term of this patent subsequent to Oct. 31, 1995, has been disclaimed.

[21] Appl. No.: 884,190

[22] Filed: Mar. 7, 1978

[30] Foreign Application Priority Data

Mar. 18, 1977 [DE] Fed. Rep. of Germany ....... 2711882

[51] Int. Cl.³ ............................................. F16C 31/06
[52] U.S. Cl. ...................................... 308/6 C; 308/201
[58] Field of Search ....................... 308/6 C, 6 R, 201

[56] References Cited

U.S. PATENT DOCUMENTS 4,123,121  10/1978  Ernst et al. ........................... 308/6 C

FOREIGN PATENT DOCUMENTS 2558196  7/1976  Fed. Rep. of Germany ........... 308/6 C

*Primary Examiner*—Charles E. Frankfort
*Attorney, Agent, or Firm*—Daniel M. Rosen

[57] ABSTRACT

A ball bearing adapted for axial movement on a shaft is comprised of a cage having guideways defining endless paths having axially extending portions for loaded and unloaded balls, and semicircular end portions. An outer sleeve surrounds the central portion of the bearing and defines races for balls in the endless paths. End rings on the axial ends of the bearing radially outwardly cover the semicircular guideway portions. The semicircular guideway portions have outwardly convex bottoms, and the end rings have concave recesses in their inner surfaces aligned with the semicircular guideways. The convex portions of the guideways and the concave portions of the recesses have common centers of curvature extending parallel to the bearing axis and displaced outwardly therefrom.

9 Claims, 5 Drawing Figures

ROLLING BEARING FOR LINEAR MOVEMENT HAVING CAGE EXTENDING BEYOND OUTER SLEEVE

BACKGROUND OF THE INVENTION

This invention relates to rolling bearings of the type generally adapted for axial movement with respect to a shaft, and is particularly directed to bearings of this type wherein a cage defining endless guideways for the rolling elements, such as balls, is centrally surrounded by an outer sleeve defining races for the balls, and surrounded at its ends by end rings.

Bearing structures of the above type are disclosed, for example, in U.S. Pat. No. 4,123,121 of the present applicants. In this arrangement, the cage is provided with a plurality of ball guides distributed about its periphery, each ball guide being comprised of a pair of axially extending guideways for loaded and unloaded balls, and a pair of semicircular reversing guideways interconnecting the axially extending guideways. An endless row of balls is preferably provided in the ball guideways. The outer sleeve is coextensive with the axially extending portions of the guideways, and defines races for balls in this portion of the guideways. The projecting ends of the guideways of the cage are radially surrounded by end rings, for example, of a plastic material. The cage may also be of a plastic material.

The present invention is directed to improvements in bearings of the above type, wherein the components for the bearing may be easier and less expensive to produce, and are easier to assemble. In addition, the invention is directed to ball bearing which are less subject to wear, particularly in the reversing zones, as well as to reducing noises in the use of the bearings, and to making the bearings resilient with respect to shaft deflection. The invention is further directed to a method for producing such bearings. The invention is also directed to the reduction of overall size of bearings of this type.

SUMMARY OF THE INVENTION

Briefly stated, in accordance with the invention, the above objectives are achieved by providing a bearing structure of the previously described type, wherein the bottoms of the reversing guideway portions of the cage extend convexly outwardly, and by providing concave recesses in the portions of the end rings disposed outwardly of the diverging guideways. The center of curvature of the convex portions of the bottoms of the cage are common with the center of curvature of the concave recesses, these centers of curvature being on an axis extending parallel to the center axis of the bearing. In other words, the bottom of the recess in the end rings, starting from an axially oriented zenith line of the recess, extend radially inwardly in the peripheral direction so that the wall thickness of the end rings is reduced only over a narrow peripheral area; the end rings may be relatively thin walled in order to enable reduction of the radial dimension of the bearing of the invention.

In accordance with a further feature of the invention, the recesses in the end rings are axially open toward the outer sleeve of the bearing. As a consequence, the end rings may be readily axially slipped over the cage filled with balls, and fastened either to the cage or to the outer sleeve by conventional techniques, such as by welding or the snapping of projections into corresponding grooves, holes or the like, so as to secure the elements of the bearing against twisting. The end rings of a bearing in accordance with the invention may thereby be produced by casting or pressure molding processes in "open" molds, i.e., with axial slidable cores which can be formed without undercuts.

In accordance with a still further feature of the invention, the cage may be produced by casting or pressure molding processes, employing radially slidable cores for molding the guideways for the loaded and unloaded balls, as well as for the two reversing guideways for the corresponding row of rolling elements.

The guideways for the unloaded rolling elements may be disposed in the cage to be radially offset outwardly with respect to the guideways for the loaded rolling elements. As a consequence, unloaded rolling elements are carried in the guideways at a small distance from the shaft, so that there is no sliding contact between these unloaded rolling elements and the shaft. The radially slidable cores for producing such guideways, in accordance with the invention, are therefore movable in a direction rotated about the center axis of the bearing by an acute angle with respect to the radial plane passing through the axis of the bearing. In other words, the guide for the radially movable cores is slightly rotated in order to readily enable the desired locating of the bottoms of the guideways. As a result, a uniformly small radial play of the balls in the reversing guideways can be provided that is independent of the size or size deviation of the angle of rotation of the individual slidable cores of casting or pressure molding molds, since the center of curvature of the concave recesses and the convex end ring bottom portions is located on the center axis about which the radially slidable core is rotated. In addition, the same end rings may be employed, regardless whether or not such radial offset of the guideways for the unloaded rolling elements in the cage has been provided.

BRIEF DESCRIPTION OF THE DRAWINGS

In order that the invention will be more clearly understood, it will now be disclosed in greater detail with reference to the accompanying drawings, wherein.

Figure 1:
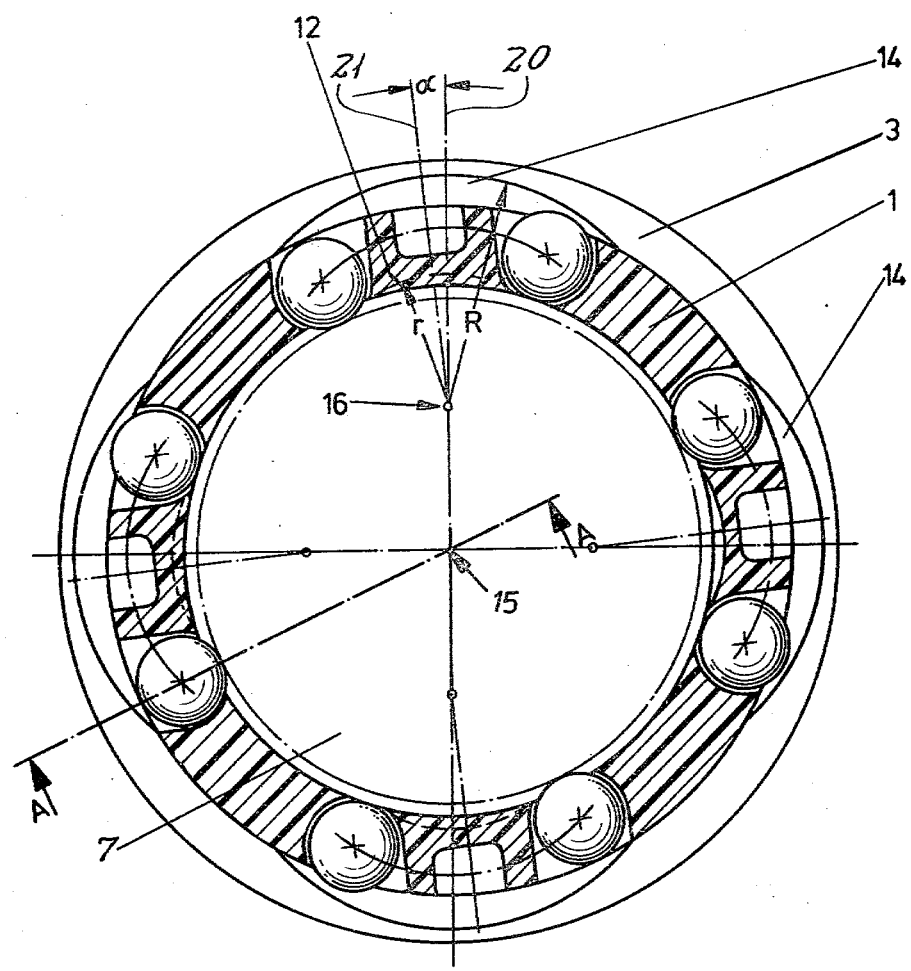
FIG. 1 is a transverse cross-sectional view of a ball bearing in accordance with the invention, taken along the lines B—B of FIG. 2.

Referring now to the drawings, there is illustrated a rolling bearing of the type generally adaptable for relative axial movement with respect to a shaft, and comprised of a cage 1 in the form of generally elongated cylindrical shell and fit within the bore of an outer sleeve 2. As will be apparent in the following paragraphs, the outer sleeve 2 extends only coextensively with the axially central portion of the cage 1, and an end ring 3 is provided radially surrounding the cage 1 at both of its ends. The end rings 3 may be identical.

Figure 2:
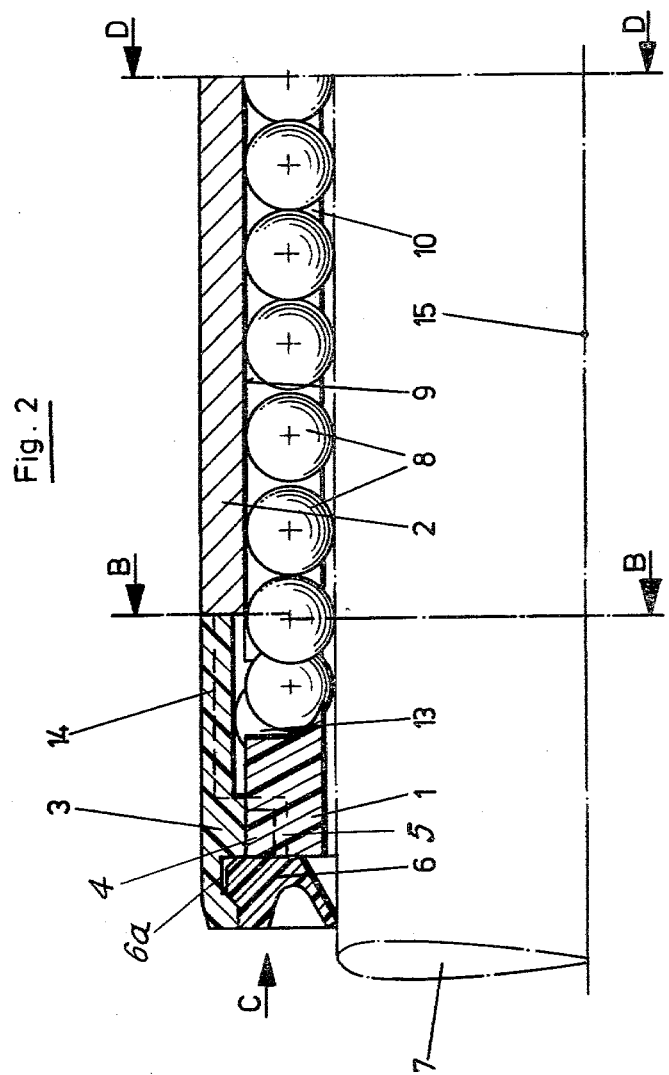
FIG. 2 is a cross-sectional view, in a radial plane, of a portion of the bearing of FIG. 1, this view only showing one axial end of the bearing.
Figure 3:
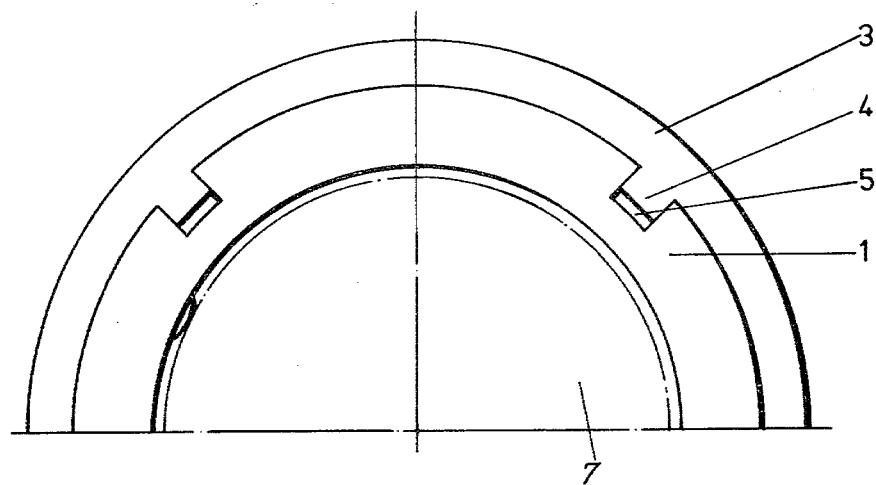
FIG. 3 is an end view of the bearing of FIG. 2, looking in the direction C, with the sealing element omitted.

In order to enable fastening of the end rings onto the cage, the end rings 3 may have radially inwardly directed projections 4, preferably at the axial ends thereof away from the sleeve 2, the projections 4 fitting into corresponding recesses 5 in the cage 1, as more clearly shown in FIGS. 2 and 3. The end rings may be permanently affixed to the cages, for example, by welding or any other conventional process, for example at the location of the projections 4. As more clearly seen in FIG. 2, the end rings 3 if desired may extend axially beyond the cage 1, and have annular grooves 6a for receiving and holding a ring gasket 6 adapted to also slide in contact with a shaft 7 on which the bearing is mounted. The shaft 7 is indicated in dot-dash lines in the drawings, since it does not form a part of the invention per se.

In the illustrated embodiment of the invention, the cage 1 is provided with four axially extending guideways 10 having radially inwardly directed slots, for accomodating rolling bearings under load, as well as four axially extending guideways 11 for unloaded rolling elements. The axially extending guideways are provided only in the axial center of the cage. Semicircular guideways 13 at each axial end of the cage join pairs of guideways 10 and 11 at the ends thereof, to form continuous guideways in the cage. Thus, the cage accomodates, at its periphery, four endless rows of rolling elements, such as balls, with the loaded balls 8 of each endless row of balls rolling between the shaft 7 and the associated axially extending race 9 in the bore of the outer sleeve. Similarly, unloaded balls 18 roll in the unloaded guideways 11, as well as in the reversing guideways 13 of the cage, so that the balls may circulate in their respective endless rows upon relative axial movement between the bearing and the shaft.

In accordance with one feature of the invention, the radial inner surfaces, i.e., bottoms 12, of the reversing guideways 13 are convex when viewed in a cross section extending transversely of the axis of the bearing, as more clearly shown in FIG. 1, wherein the bottoms 12 of the these guideway portions have radii of curvature r and centers of curvature 16. The centers of curvature 16 are on an axis parallel to the central axis 15 of the bearing, and the axis 16 is radially displaced so that the curvature of the bottoms 12 is greater than the curvature of the bore of the cage. In other words, the radii of curvature of the convex surfaces of the bottoms 12 of the reversing guideways are less than the radius of curvature of the bore of the cage.

In order to accomodate the unloaded balls 18 in the reversing guideways 13, the end rings 3 have cylindrical recesses 14 on their radial inner surfaces. These recesses preferably extend to the axial ends of the end rings toward the outer sleeve 2, but do not extend to the other axial ends of the end rings. The recesses 14 are centered over the reversing guideways 13, and have centers of curvature that coincide with the center of curvature 16 of the corresponding reversing guideways. The radius of curvature R of the recesses 14 is sufficiently large, as compared with the radius of curvature r of the reversing guideways 13, that the balls may freely circulate in the guideways.

Figure 4:
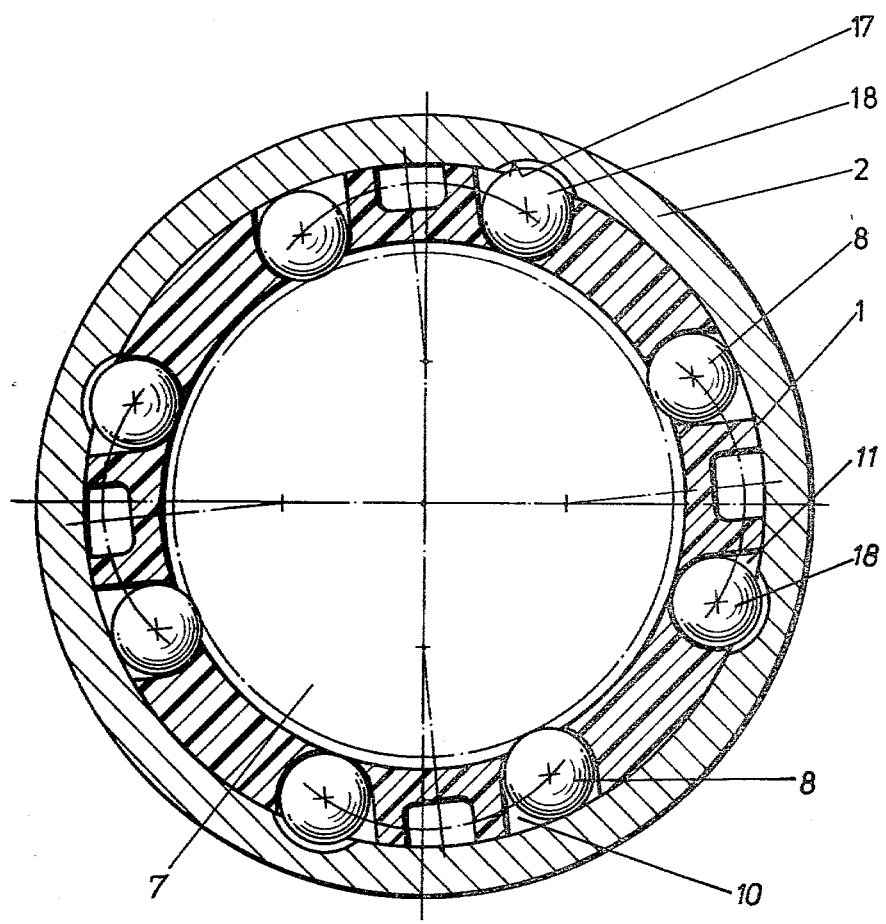
FIG. 4 is a transverse cross-sectional view of a bearing in accordance with the invention, taken along the line D—D of FIG. 2.

In the preferred embodiment of the invention, the guideways 11 for unloaded balls 18 are located in the cage 1 such that they are radially offset outwardly, with respect to the guideways 10 for loaded balls 8, in order to enable the unloaded balls 18 to be spaced radially outwardly a short distance from the shaft 7, as shown in FIG. 4. For this purpose as shown in FIG. 4, the outer sleeve 2 may be provided with axially extending grooves 17 to define races for the balls 18 not under load. The races 9 for the balls under load may merely be defined by the internal bore of the sleeve 2, as also shown in FIG. 4.

As a consequence of this radial offsetting of the guideways with respect to the central axis of the bearing, and the use of convex bottom surfaces 12 for the reversing guideways, it is apparent that straight lines extending between the centers of the balls in the corresponding loaded and unloaded guideways will not be normal to the radial plane 20 defined by the axes 15 and 16, and hence that an acute angle $\alpha$ will exist between the plane 20 and the plane 21 defined by the axis 16 and normal to the distance between the centers of the loaded balls 8 and unloaded balls 18. In other words, the centers of the balls 8 under load are farther from the radial plane 20 than the centers of the unloaded balls 18.

Figure 5:
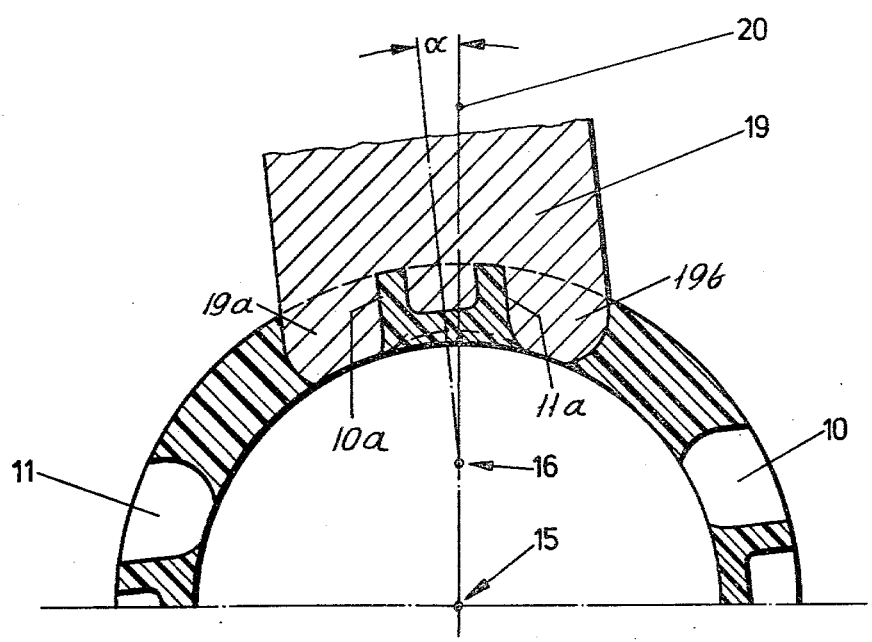
FIG. 5 is a simplified diagramatic representation of a method for casting or pressure molding of the cage of the ball bearing of FIGS. 1, and illustrating in a simplified manner the radially slidable core that may be employed in the process.

In accordance with the invention, the cage 5 may be formed of a plastic material, such as by casting or pressure molding, and specifically by an injection molding process as illustrated in FIG. 5. For this purpose, in order to mold the axially extending guideways 10 and 11 and the reversing guideways 13 therebetween, the die (not shown) is provided with a slidable core 19, which is adapted to be radially directed into and out of the die cavity. The slidable core 19 may have symmetrical projections 19a and 19b for forming the bottoms of the axially extending guideways, the end of these elongated projections 19a and 19b preferably being semicircular in accordance with the desired shape for the bottoms of the guideways. The elongated portions of the projections 19a and 19b for forming the axially extending guideways also preferably have parallel sides, in order to facilitate their removal from the molded cage. As a consequence, the sides 10a and 11a of the axially extending guideways which were formed by these parallel sides of the slidable core are also parallel, and are in planes at acute angles $\alpha$ to the plane 20 defined by the axes 15 and 16. This is particularly true with respect to the adjacent side walls 10a 10b, as seen in FIG. 5, although it will be apparent that the guideway 11 may not be adequately deep that its other side wall is formed by a parallel wall of the core. The slidable core 19 of course is shaped to simultaneously form the reversing guideways 13. The slidable core 19 is thus mounted by conventional means in its die, for movement in a direction at an angle $\alpha$ with respect to the plane 20.

The radial sliding core 20, which may have symmetrical sides, may consequently be produced relatively simply and inexpensively. Due to the angular offset in the direction of movement of the core 19, the correct radial displacement the guideways 10 and 11 can easily be provided in the cage, as desired.

The end rings 3 for the bearing in accordance with the invention preferably are identical, i.e., have identically formed recesses 14, so that they may be affixed interchangably to either end of the bearing. This of course also simplifies the production of the bearing, and reduces its cost. Any variations in the magnitude of the angle $\alpha$ will not result in narrowing of the reversing guideway in the cage, with the accompanying danger of jamming other balls, since the center of curvature of the recesses 14 and the center of curvature of the bottom surfaces 12 of the reversing guideways coincide.

The rolling bearing in accordance with the invention provides the additional substantial advantage in that it may be produced with a minimum radius, since the recesses in the reversing guideways extend only over relatively narrow peripheral regions of the walls of the end rings. As a consequence, the walls of the end rings covering the reversing guideways may be made very thin, without the necessary strength of the end rings being impaired by the recesses. In addition, in accordance with the invention, the end rings may advantageously be formed of a plastic material, for example, by injection molding.

The outer sleeves may advantageously be of steel, for example either cut from a tube or deep drawn from a round blank.

While the invention has been disclosed and described with reference to a single embodiment, it will be apparent that variations and modifications may be made therein. Thus, in place of the ring gasket 6, any other form suitable gasket may be employed, such as a sealing flange acting as a labyrinth seal affixed to the end rings or integral therewith. The outer sleeve may alternatively be circularly bent from strip steel, or may otherwise be provided with an elongated slot so that radial play between the shaft and the bearing may be varied to compensate for expansion or compression as the bearing is mounted, for example, in a housing bore. In order to provide close contact between the rolling balls and the races, both the axially extending race for the loaded balls and the axially extending race for the unloaded balls may be formed as grooves in the outer sleeve, and these grooves may be formed in the outer sleeve if desired, by stamping, so that the grooves have cross sections adapted to properly receive the balls.

It is therefore intended in the following claims to cover each such variation and modification as follows within the true spirit and scope of the invention.

What is claimed is:

1. In a rolling bearing adapted for relative axial movement with respect to a shaft, and including a cage with axially extending pairs of first and second guideways for loaded and unloaded rolling elements respectively and circular reversing guideways at the axial ends of and interconnecting each pair of first and second guideways, to form continuous paths, endless rows of rolling elements in said paths, and outer sleeve surrounding said cage and having an axial length substantially equal to the lengths of said first and second guideways, whereby the ends of said cage having said reversing guideways project axially beyond said outer sleeve, and end rings mounted to radially outwardly cover said projecting ends; the improvement wherein the radially inward surfaces of said semicircular guideways, with respect to the axis of said bearing, are radially outwardly convex and said end rings have concave recesses in their inner surfaces and radially surrounding said semicircular guideways, the centers of curvature of said surfaces of each semicircular guideway and the corresponding recess of said end ring being on a common axis parallel to said bearing axis, the centers of said second guideways being displaced radially outwardly in said cage from the centers of said first guideways, whereby rolling elements in said second guideways are held out of contact with said shaft.

2. The rolling bearing of claim 1 wherein said sleeve defines races for said rolling elements.

3. The rolling bearing of claim 1 wherein said rolling elements are balls.

4. The rolling bearing of claim 1 wherein said cage and end rings are of a plastic material.

5. The rolling bearing of claim 1 wherein the radius of curvature of said convex surfaces of said semicircular guideways is less than the radius of curvature of the bore of said cage.

6. The rolling bearing of claim 1 wherein said first guideways have radially inwardly extending slots.

7. The rolling bearing of claim 1 wherein said recesses in said end rings are open to the axial ends of said end rings toward said outer sleeve.

8. The rolling bearing of claim 1 wherein adjacent side walls of first and second guideways of a pair of guideways have parallel sides in planes at an acute angle to the plane defined by said common axis and said bearing axis.

9. The rolling bearing of claim 1 wherein the centers of said second guideways are closer to the plane defined by the corresponding common axis and said bearing axis than the center of the corresponding first guideway.

* * * * *

UNITED STATES PATENT AND TRADEMARK OFFICE
CERTIFICATE OF CORRECTION

PATENT NO. : 4,239,298
DATED : December 16, 1980
INVENTOR(S) : Horst M. Ernst, et al It is certified that error appears in the above—identified patent and that said Letters Patent is hereby corrected as shown below:

Column 6, line 11, change "surrounding" to --surround--.

Signed and Sealed this

Thirteenth Day of October 1981

[SEAL]

Attest:

GERALD J. MOSSINGHOFF

Attesting Officer     Commissioner of Patents and Trademarks